United States Patent
Phillips et al.

(10) Patent No.: US 8,966,360 B2
(45) Date of Patent: Feb. 24, 2015

(54) TRANSCRIPT EDITOR

(71) Applicant: Avid Technology, Inc., Burlington, MA (US)

(72) Inventors: Michael E. Phillips, Melrose, MA (US); Glenn Lea, Marblehead, MA (US)

(73) Assignee: Avid Technology, Inc., Burlington, MA (US)

( * ) Notice: Subject to any disclaimer, the term of this patent is extended or adjusted under 35 U.S.C. 154(b) by 234 days.

(21) Appl. No.: 13/661,098

(22) Filed: Oct. 26, 2012

(65) Prior Publication Data

US 2013/0047059 A1 Feb. 21, 2013

Related U.S. Application Data

(63) Continuation of application No. 12/748,570, filed on Mar. 29, 2010, now Pat. No. 8,302,010.

(51) Int. Cl.
| | |
|---|---|
| *G06F 17/00* | (2006.01) |
| *G10L 15/26* | (2006.01) |
| *G06F 17/24* | (2006.01) |
| *G11B 27/034* | (2006.01) |
| *G11B 27/28* | (2006.01) |
| *G11B 27/34* | (2006.01) |

(52) U.S. Cl.
CPC .............. *G10L 15/265* (2013.01); *G06F 17/24* (2013.01); *G11B 27/034* (2013.01); *G11B 27/28* (2013.01); *G11B 27/34* (2013.01)
USPC .......................................... 715/234; 715/723

(58) Field of Classification Search
CPC ........................... G06F 17/24; G06F 17/30902
USPC .......... 715/723, 234; 386/278, 285, 288, 290, 386/281
See application file for complete search history.

(56) References Cited

U.S. PATENT DOCUMENTS

| | | | | |
|---|---|---|---|---|
| 5,782,692 A | * | 7/1998 | Stelovsky | 463/1 |
| 5,818,435 A | * | 10/1998 | Kozuka et al. | 715/202 |
| 6,172,675 B1 | * | 1/2001 | Ahmad et al. | 715/251 |
| 6,473,778 B1 | | 10/2002 | Gibbon | |
| 7,096,416 B1 | * | 8/2006 | Smith et al. | 715/203 |
| 7,703,044 B2 | | 4/2010 | Graham | |
| 7,739,273 B2 | * | 6/2010 | Brodie et al. | 707/722 |
| 7,765,574 B1 | | 7/2010 | Maybury et al. | |
| 8,302,010 B2 | | 10/2012 | Phillips et al. | |
| 8,639,505 B2 | * | 1/2014 | Marquette et al. | 704/235 |
| 2003/0078973 A1 | * | 4/2003 | Przekop et al. | 709/204 |

(Continued)

OTHER PUBLICATIONS

Whittaker, Steve, et al, "Accessing Speech Data Using Strategic Fixation," Apr. 2007, Computer Speech and Language, vol. 21, Issue 2, Academic Press Ltd., pp. 296-324.*

*Primary Examiner* — Laurie Ries
(74) *Attorney, Agent, or Firm* — Oliver Strimpel

(57) ABSTRACT

A transcript editor enables text-based editing of time-based media that includes spoken dialog. It involves an augmented transcript that includes timing metadata that associates words and phrases within the transcript with corresponding temporal locations within the time-based media where the text is spoken, and editing the augmented transcript without the need for playback of the time-based media. After editing, the augmented transcript is processed by a media editing system to automatically generate an edited version of the time-based media that only includes the segments of the time-based media that include the speech corresponding to the edited augmented transcript.

20 Claims, 6 Drawing Sheets

(56) References Cited

U.S. PATENT DOCUMENTS

| | | |
|---|---|---|
| 2004/0193428 A1 | 9/2004 | Fruchter et al. |
| 2005/0171926 A1* | 8/2005 | Thione et al. .................... 707/1 |
| 2006/0015904 A1 | 1/2006 | Marcus |
| 2006/0167686 A1* | 7/2006 | Kahn ............................ 704/235 |
| 2006/0206526 A1 | 9/2006 | Sitomer |
| 2007/0061728 A1* | 3/2007 | Sitomer et al. ............... 715/723 |
| 2007/0233524 A1* | 10/2007 | Alban et al. ..................... 705/3 |
| 2008/0120538 A1 | 5/2008 | Kurz et al. |
| 2009/0024922 A1 | 1/2009 | Markowitz et al. |
| 2009/0249188 A1* | 10/2009 | Dube et al. .................... 715/234 |
| 2010/0332225 A1* | 12/2010 | Arrowood et al. ............ 704/235 |
| 2011/0289405 A1 | 11/2011 | Fritsch et al. |
| 2012/0236201 A1* | 9/2012 | Larsen et al. ................. 348/468 |
| 2012/0304062 A1* | 11/2012 | Schultz et al. ................ 715/716 |
| 2013/0031479 A1* | 1/2013 | Flowers ........................ 715/716 |
| 2014/0169767 A1* | 6/2014 | Goldberg ..................... 386/282 |

\* cited by examiner

Transcript Editor

SHAW-Session-02

FAUER
What was the name of ... that picture?

SHAW
St. Georges Island. Today, the ability to move the camera is critical. Most directors have moving camera experience and if they know how to set it up so it will cut is is a lot easier on me, if they don't it means much harder work for me. I don't go out anymore without a full-time Steadicam, all day, every day and a lot of the reason for that is the efficiency; if you have one of the top ten Steadicam operators you can shoot quickly and without such a large crew and if you have a small location you can get moving shots very efficiently. Luckily I have had one of the best Steadicam guys in the business, Mark Moore, and once producers see his work they show it to other producers and ask if they think it was shot on a dolly or Steadicam, and if you have a guy like that then you are in wonderful shape because when you get in trouble schedule-wise and you have to rush in the afternoon the Steadicam is very efficient not to mention the value of the option to move that camera.

FAUER-2009-09-01-04

SHAW-Session-01

Program | EDL | XML

FAUER
What was the name of that picture?

SHAW
St. Georges Island. Today, the ability to move the camera is critical. Most directors have moving camera experience and if they know how to set it up so it will cut it is a lot easier on me, if they don't it means much harder work for me. I don't go out anymore without a full-time Steadicam, all day, every day and a lot of the reason for that is the efficiency; if you have one of the top ten Steadicam operators you can shoot quickly and without such a large crew and if SHAW
you have a small location you can get moving shots very efficiently. Luckily I have had one of the best Steadicam guys in the business, Mark Moore, and once producers see his work they show it to other producers and ask if they think it

FIG. 4

Transcript Editor

SHAW-Session-02

FAUER
What was the name of ... that picture?

SHAW
St. Georges Island. Today, the ability to move the camera is critical. Most directors have moving camera experience and if they know how to set it up so it will cut it is a lot easier on me, if they don't it means much harder work for me. I don't go out anymore without a full-time Steadicam, all day, every day and a lot of the reason for that is the efficiency; If you have one of the top ten Steadicam operators you can shoot quickly and without such a large crew and if you have a small location you can get moving shots very efficiently. Luckily I have had one of the best Steadicam guys in the business, Mark Moore, and once producers see his work they show it to other producers and ask if they think it was shot on a dolly or Steadicam, and if you have a guy like that then you are in wonderful shape because when you get in trouble schedule-wise and you have to rush in the afternoon the Steadicam is very efficient not to mention the value of the option to move that camera.

SHAW
St. Georges Island. Today, the ability to move

FAUER-2009-09-01-04

SHAW-Session-01

[Program] [EDL] [XML]

| TAPE | SRC IN | SRC OUT | REC IN | REC |
|---|---|---|---|---|
| SHAW-Session-02 | 00:00:13:13 | 00:00:13:13 | 01:00:00:00 | 01:00: |
| SHAW-Session-02 | 00:00:13:13 | 00:01:12:17 | 01:00:00:00 | 01:00: |
| SHAW-Session-02 | 00:01:12:17 | 00:02:06:26 | 01:00:00:00 | 01:00: |

FIG. 5

Transcript Editor

SHAW-Session-02

FAUER
What was the name of ... that picture?

SHAW

St. Georges Island. Today, the ability to move the camera is critical. Most directors have moving camera experience and if they know how to set it up so it will cut it is a lot easier on me, if they don't it means much harder work for me. I don't go out anymore without a full-time Steadicam, all day, every day and a lot of the reason for that is the efficiency; if you have one of the top ten Steadicam operators you can shoot quickly and without such a large crew and if you have a small location you can get moving shots very efficiently. Luckily I have had one of the best Steadicam guys in the business, Mark Moore, and once producers see his work they show it to other producers and ask if they think it was shot on a dolly or Steadicam, and if you have a guy like that then you are in wonderful shape because when you get in trouble schedule-wise and you have to rush in the afternoon the Steadicam is very efficient not to mention the value of the option to move that camera.

FAUER-2009-09-01-04

SHAW-Session-01

```
Program | EDL | XML
<div class="teEvent-header te-header ui-corner-
all"><span class="ui-icon ui-icon-circle-triangle-
a"></span><span class="ui-icon ui-icon-trash">
</span><span class="ui-icon ui-icon-scissors">
</span>ShAW</div> <div class="teEvent-content
te-content"> <div class="tePhrase" num="00000020">
<div class="teWho">ShAW</div> <div
class="teText">you have a small location</div> <div
class="teStartTime">72.59</div> <div
class="teEndTime">73.99</div> <div
class="teStartTC">00:01:12:17</div> <div
class="teEndTC">00:01:13:29</div> <div
class="teDurTC">00:00:01:11</div> </div> <div
class="tePhrase" num=00000021"> <div
class="teWho">ShAW</div> <div class="teText">you
can get moving shots</div> <div
class="teStartTime">74.73</div> <div
class="teEndTime">76.2</div> <div
class="teStartTC">00:01:14:21</div> <div
class="teEndTC">00:01:16:06</div> <div
class="teDurTC">00:00:01:14</div> </div> <div
class="tePhrase" num=00000022"> <div,
class="teWho">ShAW</div> <div class="teText">very
efficiently. Luckily I have</div> <div
class="teStartTime">77.95</div> <div
class="teEndTime">79.77</div> <div
class="teStartTC">00:01:17:28</div> <div
class="teEndTC">00:01:19:23</div> <div
class="teDurTC">00:00:01:24</div> </div> <div
class="tePhrase" num="00000023"> <div
class="teWho">ShAW</div> <div class="teText">had
one of the best</div> <div
class="teStartTime">81:17</div> <div
class="teEndTime">82.43</div> <div
class="teStartTC">00:01:21:05</div> <div
class="teEndTC">00:01:22:12</div> <div
class="teDurTC">00:00:01:07</div> </div> <div
class="TePhrase" num="00000024"> <div
class="TeWho">ShAW</div> <div
class="teText">Steadicam guys in the business,
</div> <div class="teStartTime">83.64</div> <div
class="teEndTime">85.39</div> <div
class="teStartTC">00:01:23:19</div> <div
class="teEndTC">00:01:25:11</div> <div
class="teDurTC">00:00:01:22</div> </div> <div
class="tePhrase" num="00000025"> <div
class="teWho">ShAW</div> <div class="teText">Mark
Moore, and once producers</div> <div
class="teStartTime">85.29</div> <div
class="teEndTime">87.11</div> <div
class="teStartTc">00:01:25:08</div> <div
class="teEndTime">89.83</div> <div
class="teStartTC">00:01:28:21</div> <div
class="teEndTC">00:01:29:24</div> <div
class="teDurTC">00:00:01:03</div> </div> <div
class="tePhrase teSel" num="00000027"> <div
class="teWho">ShAW</div> <div class="teText">it to
other producers and<div> <div
class="teStartTime">90.35</div> <div
class="teEndTime">91.89</div> <div
    •
    •
```

FIG. 6

TRANSCRIPT EDITOR

CROSS REFERENCE TO RELATED APPLICATIONS

This application claims priority to and the benefit of, under 35 U.S.C. §120, and is a continuing application of pending U.S. application Ser. No. 12/748,570, filed Mar. 29, 2010, now issued as U.S. Pat. No. 8,302,010, which is related to pending U.S. patent application Ser. No. 12/748,695 filed Mar. 29, 2010, both of which are incorporated herein by reference.

BACKGROUND

Interviews and most documentaries are often recorded without the prior preparation of a script, or even of a detailed story board. Frequently, an interviewer, sound engineer, or camera operator simply turns on a microphone or starts shooting with a video camera while the subject is being interviewed. After the capture is complete, the raw media needs to be edited, often resulting in a program containing only a small fraction of the material originally captured. Typically, the editing workflow proceeds as follows. First a transcript of the captured media is prepared by hand. Then a producer or a story editor marks up a printout of the transcript to indicate the sections of the program to be retained in the story. Next, an editor receives the marked up transcript printout, and uses it as a guide to locate the media corresponding to the portions to be retained, loads these media portions, plays it, finds the media portions of interest, and then performs the edit. This process is laborious and time-consuming, in part because of the constant need to navigate back and forth through printed pages and the original media (video and/or audio), and to wait till the media is loaded and playing before performing the edits.

SUMMARY

The methods, computer program products, and systems described herein involve generating a rough cut of a time-based media program that includes recorded dialog by editing a transcript of the media without referring to the media itself.

In general, the invention features methods and computer program products for editing time-based media that includes recorded speech, the method including: receiving an augmented transcript of the recorded speech, wherein the augmented transcript includes timing information that, for each of a plurality of text words within the augmented transcript, associates that text word with a temporal location of recorded speech within the time-based media that corresponds to that text word; editing the augmented transcript, wherein the association of the timing information with each of the plurality of words within the transcript is preserved during the editing, and wherein editing the augmented transcript does not involve playback of the time-based media; and outputting the edited augmented transcript, wherein the edited augmented transcript, when received and processed by a time-based media editing system, is capable of causing the time-based media editing system to generate an edited version of the time-based media, the edited version including only segments of the time-based media that include recorded speech that corresponds to text in the edited augmented transcript.

Some embodiments include one or more of the following features. The time-based media includes a video component synchronized with the recorded speech. The time-based media is an audio-only program. The temporal sequence of the edited version of the time-based media corresponds to a sequence of text within the edited augmented transcript. The augmented transcript is represented as an XML document. The editing step is performed using a text editor. The time-based media is not accessible by the computer-based system during the editing step. The augmented transcript includes metadata associated with the time-based media in addition to the timing information, and the edited version of the time-based media is based in part on processing of the metadata by the time-based media editing system. Generating the edited version of the time-based media includes automatic linking by the media editing system to the time-based media. The time-based media editing system is a non-linear video editing system or a digital audio workstation.

BRIEF DESCRIPTION OF THE DRAWINGS

FIG. 4 is an illustration of a user interface for a transcript editor showing the text of the edited program.

FIG. 5 is an illustration of a user interface for a transcript editor showing the EDL view of the edited program.

FIG. 6 is an illustration of a user interface for a transcript editor showing the XML view of the edited program.

DETAILED DESCRIPTION

In a dialog-intensive video or audio program, such as an interview, the major portion of the program content is contained in what is said during the program, rather than in the visual information, which is typically a shot of a person talking often interspersed with background material, which is referred to as B-roll. Since text is easier and faster to read and edit than video or audio, most documentaries and interviews are edited "on paper" first, to generate what is referred to as a "paper cut" or "radio cut." Thus, the current workflow for creating such programs starts with the original footage, which is transcribed by hand and marked up with timing information indicating the location of the corresponding footage in the original media, and the character who is speaking. A producer or story editor annotates the transcript to indicate which parts of the program are to be retained, and in what order. The editor then uses the annotated transcript, and its associated timing information, to find the clips within the original footage, and edits them to produce the finished program. The process involves two labor-intensive, manual processes. First, the transcriber must listen to all the original footage in order to transcribe the audio, noting the location within the original footage, such as time code, offset, or other time or frame indicator, and the identity of the character speaking. Second, the editor refers to the annotated transcript in order to locate the media to be edited, and builds up a timeline of the program being edited by referring back and forth between the annotated transcript, and the media.

In the workflow described herein, the process of creating a rough cut edit of a speech-intensive program is greatly accelerated. The editing methods described can be used on any media that includes audio speech, and specifically apply to video accompanied by audio, or to audio only. As used herein, dialog refers to spoken speech, including speech spoken by one or more people.

Figure 1:
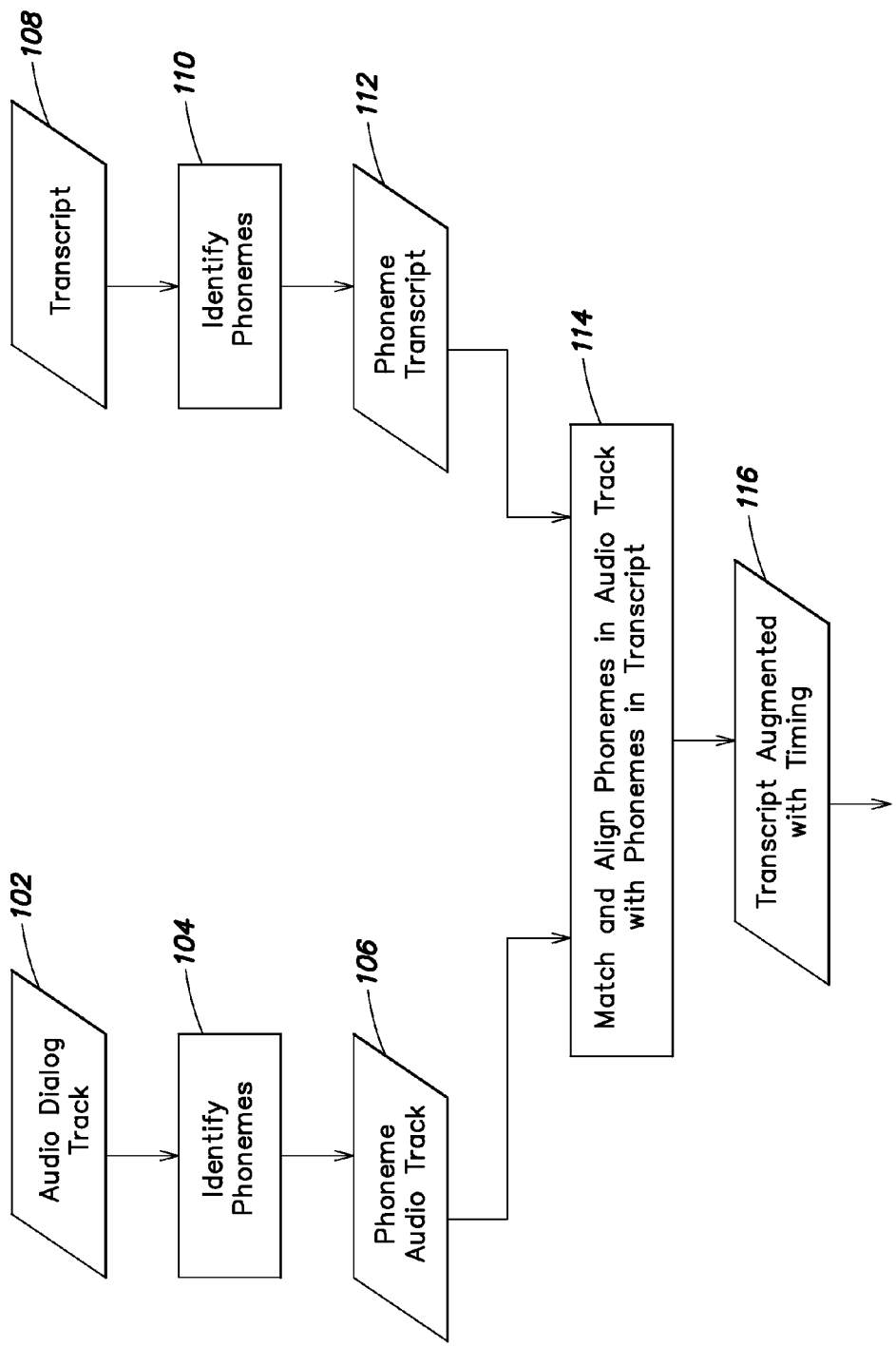
FIG. 1 is flow diagram for generating a script with media timing information.

The workflow starts with a transcript that has been created by a hand-transcriber playing back the original media. In generating a word-accurate transcript, the transcriber may be assisted by using a tool such as the spot dialog editor, described in related U.S. patent application, entitled "Spot Dialog Editor, Ser. No. 12/748,695, now issued as U.S. Pat. No. 8,572,488. In the first stage of the process, the transcript is augmented with word or phrase-accurate timing information. In the second stage, the augmented transcript is edited in the absence of its corresponding original media to produce an output file that can be input into a media editing system, such as video editor or digital audio workstation, to automatically produce a rough cut of the edited program. FIG. 1 is a flow diagram showing the main steps in the first stage. The system loads audio dialog track 102 of the media to be edited into an audio recognition system that analyzes the speech in the audio dialog track and identifies the phonemes present within the speech (step 104). This process generates phoneme audio track 106, which contains a sequence of the identified phonemes and the time codes of the locations within the audio dialog track where they occur. Note that it is not necessary to recognize the words or understand the text being spoken— detection of the phonemes is sufficient. Such an engine is available from vendors such as Nexidia Inc. of Atlanta Ga., which offers products that can process audio at rates of 250 or greater times faster than real time. For each program being edited, the system also has access to transcript 108. Breaking text into text-based phonemes (step 110) is readily accomplished, to generate the phoneme version of the transcript (112). The system then compares phoneme-based transcript 112 with phoneme audio track 106, attempting to match up the phonemes in the transcript with those in the audio track (step 114), When it finds a match, the system inserts into the transcript the timing information from the matching word or phrase in the phoneme audio track. The timing information is expressed as a timing offset from the head of the track; alternative representations of the timing information include a time code and/or frame number. In sum, the media essence is indexed by phoneme, is associated with metadata (timing data), and is inserted into the transcript. One system for producing such a time-augmented transcript is described in U.S. Pat. Nos. 7,231,351, and 7,263,484, which are wholly incorporated herein by reference. Other methods of generating the timing information and adding them to the transcript may be employed, such as for example speech recognition, with matching at the word level rather than at the phoneme level. The methods described herein are not dependent on the specific manner in which the timing information that is used to augment the transcript is obtained.

Figure 2:
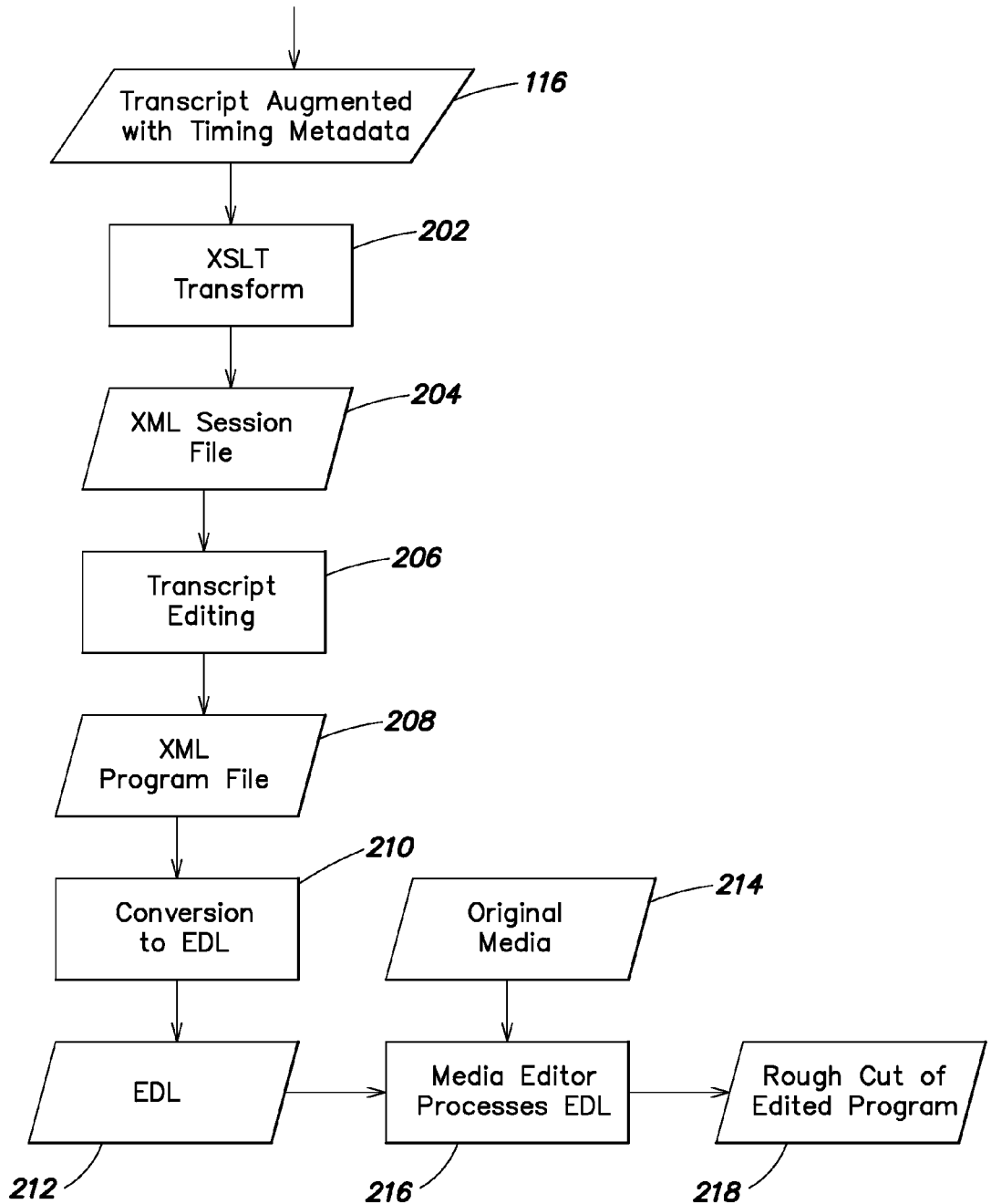
FIG. 2 is a flow diagram for generating a rough cut of a media program by editing a transcript.

We now describe the transcript editing process with reference to the flow diagram shown in FIG. 2. The system performs an XSLT transform (step 202) on augmented transcript 116, converting it into an XML session file 204. At this point, the story editor or producer views a text version of the transcript corresponding to the media being edited. The timing information is associated with the text at a word-accurate level, but that information does not need to be displayed. Instead, the story editor or producer views and edits one or more XML session files 204, i.e., edits the transcript (step 206) using a text editing tool called the transcript editor. In the described embodiment, the transcript editor runs in a web browser; in other embodiments it runs as a separate local or mobile application. Using the transcript editor, the editor can select one or more text spans, cut, copy, or paste portions of the text, reorder the program, simply by editing the augmented transcript text file. Since there is no need to play back the media, i.e., viewing video and/or listening to audio, while editing the transcript, the editing can be performed with a low-powered system, such as a laptop, smart phone, or netbook, and there is no requirement for large local storage or even for a connection to the Internet. Indeed, the editing of the augmented transcript can be performed by a story editor or producer who is travelling, and who may not have access to the Internet. As the user selects and orders the text, the transcript editor constructs an XML program tree, which represents all of the selected text, including all of the metadata associated with each fragment of text. As a result of transcript editing, an XML program file 208 is output. This contains all the information required to generate an edited program from the original media using the embedded program source metadata. Since the XML program file does not need to contain the original media files, it is a small document that can readily be emailed back to a studio where the media files reside. Furthermore, transcript editing is independent of the media resolution or other media parameters; a single transcript editor session can be used to generate multiple versions of a program, each having a different media resolution or other parameter.

In the described embodiment, XML program file 208 undergoes conversion (step 210) into edit decision list (EDL) 212 that is suitable for import into a media editing system, such as a non-linear video editor, or a digital audio workstation. In some embodiments, the media editor is able to import the XML program file directly without the need for EDL conversion step 210. The media editing system has access to original media 214, and processes (step 216) original media 214 in accordance with EDL 212 (or XML program file 208), to generate rough edited version 218 of the program, often referred to as a radio cut.

For documentaries and interviews that consist largely of dialog, rough edit version 218 already contains the important editing decisions that reflect the story editor and producer's choice of what content should be presented, and in what order. Both the elapsed time and cost of reaching this point is radically reduced by the automation of the process of time-aligning the transcript, and the ease of editing the program via a text only document from a remote location without the need for accessing or playing back the corresponding media (video and/or audio) files. Furthermore, the embedding of the metadata describing the original source of the media in the augmented transcript enables the media editing system to automatically re-link to the source picture and sound elements online.

We now describe an implementation of a transcript editing process and system. Initially, a transcript is created using a script editing tool. One example of such a tool is FINAL DRAFT®, available from Final Draft. Inc., of Calabasas, Calif., which facilitates the capture of basic metadata to be associated with the text of the script. The following is a sample portion of an illustrative script containing the text:

FAUER

I think my favorite cameraman is probably Vittorio Storaro. His style, not to mention the way he dresses with his scarves of different colors depending on his different moods, makes him one of my all-time heroes.

When entered into FINAL DRAFT, the above portion of the script is represented as an XML document, in which tagged information denoting the identity of the speaker is added to the text. The portion of the XML document generated by FINAL DRAFT to represent the above portion of the script is as follows:

```
...
<Paragraph Type="Character">
    <Text>FAUER</Text>
</Paragraph>
<Paragraph Type="Dialogue">
    <Text>I think my favorite cameraman is probably Vittorio Storaro.
    His style, not to mention the way he dresses with his scarves of
    different colors depending on his different moods, makes him one
    of my all-time heroes.
    </Text>
</Paragraph>
```

Using the phoneme recognition and matching process described above in connection with FIG. 1, timing information denoting where in the original media the text occurs is generated. The timing information is then added to XML FINAL DRAFT output to generate an augmented XML FINAL DRAFT file, a portion of which is shown below:

```
...
<Paragraph Type="Character">
    <Text>FAUER</Text>
</Paragraph>
<Paragraph Type="Dialogue">
    <TimeStamps>
        <TimeStamp startTime="155.27" endTime="156.95"
        score="89.92883">
                        I think my favorite
                        cameraman </TimeStamp>
        <TimeStamp startTime="156.52" endTime="158.41"
        score="69.78341">
                        is probably Vittorio Storaro. </TimeStamp>
        <TimeStamp startTime="161.43" endTime="162.97"
        score="69.84783">
                        His style, not to mention </TimeStamp>
        <TimeStamp startTime="163.44" endTime="164.77"
        score="71.36102">
                        the way he dresses with </TimeStamp>
        <TimeStamp startTime="166.59" endTime="168.48"
        score="63.73061">
                        his scarves of different colors </TimeStamp>
        ...
                        <TimeStamp startTime="175.72" end-
Time="176.49"
score="84.18935">
                        all-time heroes. </TimeStamp>
    </TimeStamps>
</Paragraph>
...
```

The system then converts the timing-augmented XML file into an intermediate XML file called an XML Session File, using an XSLT transform. Session Files omit the information that is not needed during the transcript editing process, such as the confidence levels of the audio matching process, as well as repetitions of text from the transcript. A sample Session File portion is as follows:

```
...
<ul class="teSession-content te-content">
    <li class="teEvent" num="00000003">
        <div class="teEvent-header te-header">FAUER</div>
        <div class="teEvent-content te-content">
            <div class="tePhrase" num="00000001">
                <div class="teWho">FAUER</div>
                <div class="teText">I think my favorite cameraman</div>
                <div class="teStartTime">155.27</div>
                <div class="teEndTime">156.95</div>
            </div>
            <div class="tePhrase" num="00000002">
                <div class="teWho">FAUER</div>
                <div class="teText">is probably Vittorio Storaro.</div>
                <div class="teStartTime">156.52</div>
```
```
                <div class="teEndTime">158.41</div>
            </div>
            <div class="tePhrase" num="00000003">
                <div class="teWho">FAUER</div>
                <div class="teText">His style, not to mention</div>
                <div class="teStartTime">161.43</div>
                <div class="teEndTime">162.97</div>
            </div>
            ...
    </li>
<ul>
...
```

The XML Session file is then accessed by the transcript editor tool, which provides a user with a simple interface for editing a text view of the transcript, while retaining in the background all the timing metadata, as well as any additional metadata, described further below, that is supplied together with a script or the transcript. The output of the transcript editor is an XML program file for the media program corresponding to the edited transcript, such as shown below:

```
...
<ul class="teProgram-content te-content">
    <li class="teEvent" num="00000003">
        <div class="teEvent-header te-header">FAUER</div>
        <div class="teEvent-content te-content">
            <div class="tePhrase" num="00000001">
                <div class="teWho">FAUER</div>
                <div class="teText">I think my favorite cameraman</div>
                <div class="teStartTime">155.27</div>
                <div class="teEndTime">156.95</div>
            </div>
            <div class="tePhrase" num="00000002">
                <div class="teWho">FAUER</div>
                <div class="teText">is probably Vittorio Storaro .</div>
                <div class="teStartTime">156.52</div>
                <div class="teEndTime">158.41</div>
            </div>
            <div class="tePhrase" num="00000007">
                <div class="teWho">FAUER</div>
                <div class="teText">one of my</div>
                <div class="teStartTime">174.96</div>
                <div class="teEndTime">176.22</div>
            </div>
            ...
    </li>
<ul>
....
```

Subsequently, the XML program file can be converted if necessary into a suitable form, such as an EDL, for import as a sequence by a media editing system, which in turn uses either the imported EDL, or directly uses the imported XML program file, to generate a rough cut or radio cut of the program that can be played back and further edited. Thus the process enables an editor to perform "program" editing on a transcript in the absence of the media that corresponds to the transcript, deferring the playback of a media program corresponding to the edits to a later stage when the XML produced by the transcript editor is imported into a media editor that has access to the source media.

Figure 3:
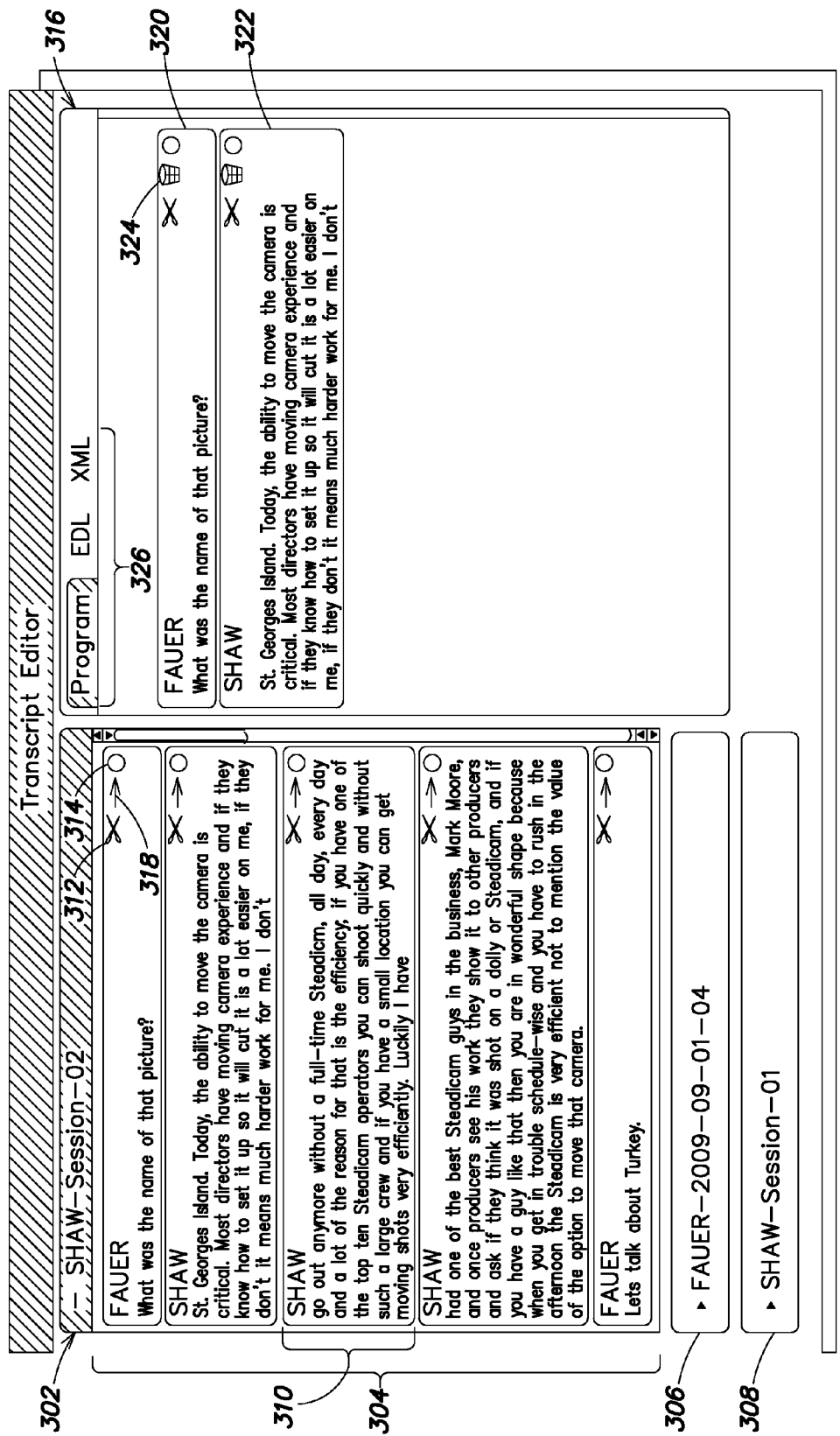
FIG. 3 shows a graphical user interface for a transcript editor.

An example of a user interface for the transcript editor is illustrated in FIG. 3, which is a screen shot of a computer-based embodiment of the transcript editor. Left hand column 302 shows the transcript broken up into sessions, which are portions of the interview broken out for organizational convenience. In the illustrated embodiment, a session corresponds to an uninterrupted portion of a recorded interview. To facilitate moving around within the transcript, the user can display sessions as collapsed or open. For example, session 304 is open to show the text in full, while sessions 306 and 308 are closed. In one embodiment, sessions are opened and closed by clicking on them. Each session is composed of one or more events, such as event 310, a portion of text spoken by Shaw within session 304. An event corresponds to a span of a program included within an EDL. In the illustrated embodiment, long events can be split into one or more shorter events by selecting text to be split, and clicking on scissors 312. An event can be compacted or expanded by clicking on circle icon 314. Right hand column 316 shows the edited program being built during the course of transcript editing. An event is selected for inclusion in the program by clicking on arrow 318. For example, FIG. 3 shows two events 320 and 322 that have been selected for inclusion in the program being built. Events that appear in the program being built can be removed from the program (using trash bin icon 324), and split up or expanded/compacted as described above.

Editing can also be performed by copying and pasting selected sections into a new document; all the metadata associated with the section is carried over with the selected section into the new document. The new document becomes the XML program file, which is brought back into the media editing environment, with access to the media being edited.

A story editor or producer may work with the text, or program view of the program being built up, as is illustrated in FIG. 3, 316, Also available are EDL and XML views, selected in the illustrated embodiment via tabs 326. In FIG. 4, the text view has been selected for viewing as the program is being built up. In FIG. 5, the EDL view is selected, and the right hand part of the display shows the EDL view of the text shown in FIG. 4. In FIG. 6 the XML view of the same text is shown, including the timing information that will later be used by a media editing system to generate the rough cut program.

The transcript editing methods and systems described above start from transcript 108 (FIG. 1). The basic component of the transcript are the words of the spoken dialog, whether prepared by a script writer prior to generating the media, i.e., prior to shooting video and or recording audio, or after generating the media by transcribing the speech from the media. In addition to text and the timing information (start time, end time) described above, transcripts include a variety of metadata, such as video related information including, for example, frame rate, shoot date, time of day, camera type, camera roll, location name, shoot location GPS, scene, take, sound roll, production timecode, HD tape name and timecode, SD tapename and sound code, pulldown, keycode, pan and scan, character, and user-defined metadata such as comments and descriptions. The metadata is native to the media essence file, or is added at various stages during the media workflow as part of an editorial or media asset management (MAM) system. During the process of phonetic indexing described above, some or all of the additional metadata can be inserted into the augmented transcript. Extending the scheme described above, the additional metadata is incorporated into the XML session file using additional tags. Additional metadata derived from the editorial process, such as editor comments, and additional metadata from the phonetic indexing process are also included in the augmented transcript.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), stereoscopic displays, and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. In a computer-based system, a method of editing a time-based media program that includes recorded speech, the method comprising:
receiving an augmented transcript of the recorded speech in a mark-up language format, wherein the augmented transcript includes text of a transcript of the recorded speech and timing information that, for each of a plurality of words of the text within the transcript, associates that text word with a temporal location of recorded speech within the time-based media program that corresponds to that text word;

in a user interface displaying a transcript text view of the augmented transcript, editing the transcript text of the augmented transcript, wherein the editing comprises selecting one or more spans of text words, copying a span of the text words, and pasting a span of the text words into the transcript text, wherein the association of the timing information with each of the plurality of words within the transcript is preserved during the editing; and outputting the edited augmented transcript, wherein the edited augmented transcript, when received and processed by a time-based media editing system, is capable of causing the time-based media editing system to generate an edited version of the time-based media program that includes time-based media in a temporal sequence that corresponds to the transcript text of the edited augmented transcript.

2. The method of claim 1, wherein the time-based media program includes a video component synchronized with the recorded speech.

3. The method of claim 1, wherein the time-based media program is an audio-only program.

4. The method of claim 1, wherein the mark-up language is XML.

5. The method of claim 1, wherein the editing step is performed using text editing software.

6. The method of claim 1, wherein the time-based media program is not accessible by the computer-based system during the editing step.

7. The method of claim 1, wherein the augmented transcript includes metadata associated with the time-based media program in addition to the timing information, and wherein the edited version of the time-based media program is based in part on processing of the metadata by the time-based media editing system.

8. The method of claim 1, wherein generating the edited version of the time-based media program includes automatic linking by the media editing system to time-based media corresponding to the edited time-based media program.

9. The method of claim 1, wherein the time-based media editing system is a non-linear video editing system.

10. The method of claim 1, wherein the time-based media editing system is a digital audio workstation.

11. A computer program product, comprising:
a non-transitory computer-readable medium with computer program instructions encoded thereon, wherein the computer program instructions, when processed by a computer, instruct the computer to perform a method for enabling a user to edit a time-based media program that includes recorded speech, the method comprising:
causing the computer to receive an augmented transcript of the recorded speech in a mark-up language format, wherein the augmented transcript includes text of a transcript of the recorded speech and timing information that, for each of a plurality of words of the text within the transcript, associates that text word with a temporal location of recorded speech within the time-based media program that corresponds to that text word;

in a user interface displaying a transcript text view of the augmented transcript, enabling the user to edit the transcript text of the augmented transcript, wherein the editing comprises selecting one or more spans of text words, copying a span of the text words, and pasting a span of the text words into the transcript text, wherein the association of the timing information with each of the plurality of words within the transcript is preserved during the editing, and wherein editing the augmented transcript does not involve playback of the time-based media; and causing the computer to output the edited augmented transcript, wherein the edited augmented transcript, when received and processed by a time-based media editing system, is capable of causing the time-based media editing system to generate an edited version of the time-based media program that includes time-based media in a temporal sequence that corresponds to the transcript text of the edited augmented transcript.

12. The computer program product of claim 11, wherein the time-based media program includes a video component synchronized with the recorded speech.

13. The computer program product of claim 11, wherein the editing step is performed using a text editor.

14. The computer program product of claim 11, wherein the time-based media program is not accessible by the computer during the editing step.

15. The computer program product of claim 11, wherein the augmented transcript includes metadata associated with the time-based media program in addition to the timing information, and wherein the edited version of the time-based media program is based in part on processing of the metadata by the time-based media editing system.

16. The computer program product of claim 11, wherein generating the edited version of the time-based media program includes automatic linking by the media editing system to time-based media corresponding to the edited time-based media program.

17. The computer program product of claim 11, wherein the time-based media editing system is a non-linear video editing system.

18. The computer program product of claim 11, wherein the time-based media editing system is a digital audio workstation.

19. A system for editing a time-based media program that includes recorded speech, the system comprising:
a processor in data communication with an input, a display, and an output, wherein the processor is programmed to:
cause the input to receive an augmented transcript of the recorded speech in a mark-up language format, wherein the augmented transcript includes text of a transcript of the recorded speech and timing information that, for each of a plurality of words of the text within the transcript, associates that text word with a temporal location of recorded speech within the time-based media program that corresponds to that text word;

display a user interface on the display, the user interface including a transcript text view of the augmented transcript;

receive editing commands from a user of the system, wherein the editing commands enable the user to edit the transcript text of the augmented transcript, wherein the editing commands include commands to select one or more spans of text words, copy a span of the text words, and paste a span of the text words into the transcript text, wherein the association of the timing information with each of the plurality of words within the transcript is preserved during the editing, and wherein editing the augmented transcript does not involve playback of the time-based media; and cause the output to output the edited augmented transcript, wherein the edited augmented transcript, when received and processed by a time-based media editing system, is capable of causing the time-based media editing system to generate an edited version of the time-based media program that includes time-based media in a temporal sequence that corresponds to the transcript text of the edited augmented transcript, the edited version including only segments of the time-based media program that include recorded speech that corresponds to transcript text in the edited augmented transcript.

20. In a computer-based system, a method of editing a time-based media program that includes recorded speech, the method comprising:

receiving an augmented transcript of the recorded speech in a mark-up language format, wherein the augmented transcript includes text of a transcript of the recorded speech and timing information that, for each of a plurality of words of the text within the transcript, associates that text word with a temporal location of recorded speech within the time-based media program that corresponds to that text word;

enabling a user of the computer-based system to edit the transcript text of the augmented transcript via a user interface, wherein the user interface displays a transcript text view of the augmented transcript together with at least one of an edit decision list view and a mark-up language view for editing the time-based media program according to edits performed on the transcript text; and outputting the edited augmented transcript, wherein the edited augmented transcript, when received and processed by a time-based media editing system, is capable of causing the time-based media editing system to generate an edited version of the time-based media program that includes time-based media in a temporal sequence that corresponds to the transcript text of the edited augmented transcript.

* * * * *